(No Model.)
W. STANLEY, Jr.
ALTERNATING CURRENT MOTOR.
No. 520,620. Patented May 29, 1894.
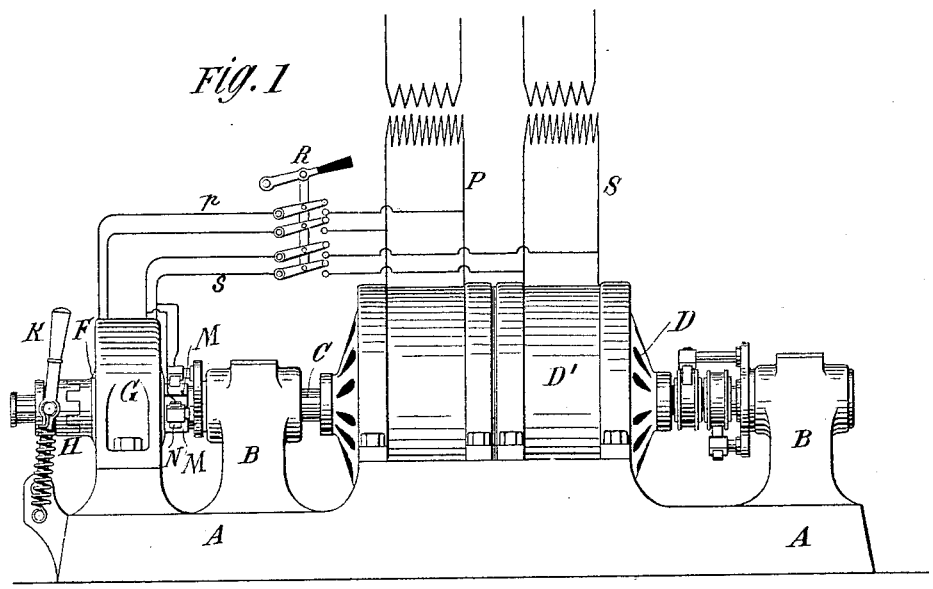
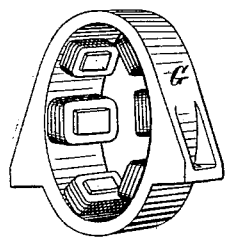
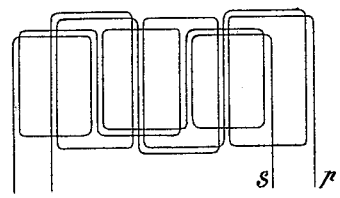
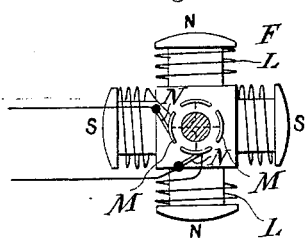
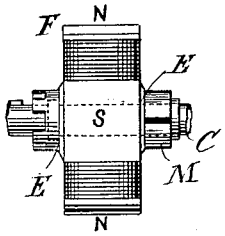
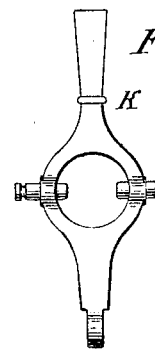
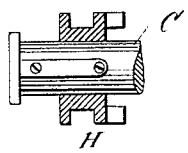
Witnesses:
Raphaël Netter
James N. Catlow
Inventor
William Stanley Jr.
by Duncan & Page,
Attorneys

UNITED STATES PATENT OFFICE.

WILLIAM STANLEY, JR., OF PITTSFIELD, MASSACHUSETTS, ASSIGNOR TO THE STANLEY LABORATORY COMPANY, OF SAME PLACE.

ALTERNATING-CURRENT MOTOR.

SPECIFICATION forming part of Letters Patent No. 520,620, dated May 29, 1894.

Application filed February 1, 1894. Serial No. 498,738. (No model.)

*To all whom it may concern:*

Be it known that I, WILLIAM STANLEY, Jr., a citizen of the United States, residing at Pittsfield, in the county of Berkshire and State of Massachusetts, have invented certain new and useful Improvements in Alternating-Current Motors, of which the following is a specification, reference being had to the drawings accompanying and forming a part of the same.

In a patent granted to the Stanley Laboratory Company as assignee of John F. Kelly, No. 508,887, dated November 14, 1893, is shown and described, what may be termed a mechanical condenser, in combination with an alternating current circuit as a means for neutralizing the effects of self induction in the same.

My present invention pertains to this form of condenser, and consists in a new and useful means for operating the same. In any circuit possessing self induction an alternating current which passes through it is retarded, and this retarded current may be considered as the resultant of two component currents, one coinciding in phase with the impressed electro-motive force, the other, called the lagging component, at right angles thereto.

It has been explained in the patent above referred to that any excitation of the field or secondary element of a synchronous alternate current motor above or below a certain defined point will cause a greater current to flow in the armature or primary circuit which, in phase, will be in advance of or behind the impressed electro-motive force according as such excitation is higher or lower than the said defined degree. If a synchronous motor, therefore, be run without other load than its own friction, the current which flows through its primary coils may be pushed greatly in advance of the impressed electro-motive force and its volume made many times that of the lagging component, by increasing the excitation of the field, and under such conditions it is obvious that it will have the same effect as, and may be used as a substitute for an ordinary condenser.

My invention has for its object to utilize a synchronous motor for this purpose in an economical and effective manner and this I accomplish by providing a mechanical connection or clutch between a working alternating current motor possessing self induction, and an unloaded synchronous motor to bring the latter up so nearly to speed that when the clutch is released it will run up in synchronism with the generator.

The invention is applicable to various kinds of motor, as will be more fully explained. That is to say, both motors may be single phase or multiphase motors, and the working motor may have a stationary torque or may require some special means for starting it. In the drawings, however, I have illustrated a two phase self starting working motor, and a synchronous motor with two circuits.

Figure 1 is a side elevation of the two motors hereinbefore described and a diagram of the circuit connections. Fig. 2 is a perspective view of the stationary element of the synchronous motor. Fig. 3 is a diagram of the winding of the same. Fig. 4 is an end view of the rotary element of the synchronous motor. Fig. 5 is a side elevation of the same. Figs. 6, 7 and 8 are details of parts constituting the clutch mechanism.

A is a bed plate or base of sufficient size to contain all parts of the apparatus, B B being the standards for the bearings.

C is the shaft mounted in the standards B, and carrying the secondary element D of a self starting alternating current motor, which in the present case is assumed to be any two phase alternate current motor, the primary element designated by D'. On the shaft C there is also mounted, but loosely on a sleeve E, the rotary magnet F constituting the secondary element of a small motor, which is surrounded by a stationary primary element G provided with a plurality of inwardly projecting poles. On shaft C is also a clutch H which is shown in plan in Fig. 8 and in section in Fig. 7 that turns with the shaft but which is movable freely along the same by means of a clutch lever K which is shown detached in Fig. 6. This clutch may be of any ordinary construction that will permit the element F to be locked to the shaft C and released therefrom when it has attained the proper speed of rotation.

The element F is shown as provided with four poles wound with coils L and rotating with it is a commutator having four plates M connected in pairs as indicated in dotted lines in Fig. 4. Brushes N are arranged to bear on one plate of each pair at a time so that if the brushes be supplied with an alternating current of a period that corresponds to the speed of rotation, the poles of the magnet will be magnetized and always with the same sign. Any other means for exciting the magnet may be employed, but in all cases the coils are so proportioned to the normal energizing current that the degree of excitation of the magnet will cause the proper current to flow in the coils of the primary element to neutralize the lagging component of the circuit with which said coils are connected.

In the case presented for illustration there are two line circuits P S, the currents in which are assumed to differ by a quarter phase. Hence to neutralize the lagging effect in both circuits the synchronous motor must have two corresponding primary circuits, as $p$, $s$, and the plan of winding which I employ to cause their two circuits to co-operate properly is shown in Fig. 3.

The conductors of the two primary circuits are wound alternately in adjacent grooves, forming coils each of which surrounds two poles, the direction of winding of the coils of each circuit being alternately in opposite direction. This is a well known form of primary winding and produces the reversals of magnetism necessary to secure synchronous rotation. Switches R are employed to control the connection between the primary circuits of the synchronous motor and the mains P S.

The operation of the apparatus is as follows: The working motor is started by the currents supplied to its primary element by the circuits P S the synchronous motor being at the time connected to the shaft C by means of the clutch H. When the working motor has attained its normal speed which will usually be somewhat below actual synchronism the synchronous motor circuits $p$. $s$. are connected with the mains P S by the switches R, and the clutch is thrown to release the rotary element F. The latter at once runs up to synchronous speed and by reason of its predetermined excitation the currents flowing in the primary coils are increased in volume and advanced in phase.

As I have previously stated any form of working and compensating motor exhibiting the necessary properties may be employed.

The invention is particularly applicable to systems operated by currents of low frequency and when motors of large size are employed, and in which the capacity and cost of condensers would become very great.

What I claim is—

1. The combination with an alternating current motor, of a synchronous motor having its primary coils connected with the main circuit, and adapted by the degree of excitation of its secondary element, to produce in the coils of its primary element an electromotive force in advance of that in said main circuit, and a clutch intermediate to the two motors as set forth.

2. The combination with an alternating current working motor of a compensating synchronous motor of the kind described, means for mechanically connecting and disconnecting the two motors, and electrical connections between both motors and the supply circuit, as set forth.

3. The combination with an alternating current motor of a compensating synchronous motor having its rotary secondary element loosely mounted on the shaft of the working motor, a clutch for connecting and disconnecting said element and shaft, and circuit connections between both motors and the supply circuit, as set forth.

4. The combination with an alternating current motor having a plurality of energizing circuits, of a compensating synchronous motor having a plurality of circuits corresponding to and connected with those of the working motor, and clutch mechanism between the motors, as set forth.

WILLIAM STANLEY, Jr.

Witnesses:
JOHN F. KELLY,
JOHN F. VAN DUSEN.